United States Patent
Ogus et al.

(10) Patent No.: US 8,010,648 B2
(45) Date of Patent: Aug. 30, 2011

(54) REPLICA PLACEMENT IN A DISTRIBUTED STORAGE SYSTEM

(75) Inventors: Aaron William Ogus, Redmond, WA (US); Samuel James McKelvie, Seattle, WA (US); Bradley Gene Calder, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 182 days.

(21) Appl. No.: 12/258,045

(22) Filed: Oct. 24, 2008

(65) Prior Publication Data

US 2010/0106808 A1    Apr. 29, 2010

(51) Int. Cl.
*G06F 15/173* (2006.01)
*G06F 7/00* (2006.01)
*G06F 9/44* (2006.01)
*G06F 11/00* (2006.01)

(52) U.S. Cl. ........ 709/223; 709/226; 707/627; 707/633; 707/636; 707/637; 707/652; 717/171; 717/172; 714/4.1

(58) Field of Classification Search ................... 709/203, 709/211, 216, 217–219, 223, 226; 707/610, 707/652, 660, 627, 633, 636–637; 714/100, 714/1–6, 4.1; 711/161–162; 717/171–172
See application file for complete search history.

(56) References Cited

U.S. PATENT DOCUMENTS

| | | | |
|---|---|---|---|
| 6,167,427 A * | 12/2000 | Rabinovich et al. | 709/201 |
| 6,256,675 B1 | 7/2001 | Rabinovich | |
| 6,907,504 B2 | 6/2005 | Burton | |
| 7,096,338 B2 | 8/2006 | Takahashi | |
| 7,415,487 B2 * | 8/2008 | Bell et al. | 707/999.201 |
| 7,546,486 B2 * | 6/2009 | Slik et al. | 714/15 |
| 7,590,149 B1 * | 9/2009 | Bharali et al. | 709/238 |
| 7,603,529 B1 * | 10/2009 | MacHardy et al. | 711/162 |
| 7,721,157 B2 * | 5/2010 | Spitz et al. | 714/47 |
| 2004/0153710 A1 * | 8/2004 | Fair | 714/4 |
| 2006/0075001 A1 * | 4/2006 | Canning et al. | 707/203 |
| 2006/0168154 A1 | 7/2006 | Zhang | |
| 2008/0005199 A1 | 1/2008 | Chen | |
| 2008/0065704 A1 | 3/2008 | MacCormick | |
| 2008/0263535 A1 * | 10/2008 | Dias et al. | 717/168 |
| 2009/0043826 A1 * | 2/2009 | Butterworth et al. | 707/202 |
| 2010/0042869 A1 * | 2/2010 | Szabo et al. | 714/4 |
| 2010/0058318 A1 * | 3/2010 | Bernabeu-Auban et al. | 717/172 |

OTHER PUBLICATIONS

Ghemawat et al, The Google File System, ACM, Oct. 2003, pp. 29-43.*
Ghemawat et al., The Google File System, http://www.cs.cornell.edu/Courses/cs614/2004sp/papers/gfs.pdf, ACM 2003, pp. 29-43.*
Modeling Replica Placement in a Distributed File System: Narrowing the Gap between Competitive Analysis and Simulation, http://citeseerx.ist.psu.edu/viewdoc/summary?doi=10.1.1.22.3404.
Continuous Replica Placement Schemes in Distributed Systems, http://www.cs.ust.hk/~luke/PAPERS/ics05.pdf.

(Continued)

*Primary Examiner* — Gregory G Todd
(74) *Attorney, Agent, or Firm* — Shook Hardy & Bacon LLP

(57) ABSTRACT

Replica placement in a network of nodes is provided. Nodes are selected for replica placement to satisfy location-based preferences. Additionally, nodes are selected for replica placement to spread replicas of the same data over different fault domains and upgrade domains. In some instances, nodes may be selected for replica placement based on load-based information for the nodes.

19 Claims, 9 Drawing Sheets

OTHER PUBLICATIONS

Replica Placement for High Availability in Distributed Stream Processing Systems, http://www.cs.ucr.edu/~trep/publications/debs08.pdf.

Ghemawat et al., The Google File System, http://www.cs.cornell.edu/Courses/cs614/2004sp/papers/gfs.pdf.

Design Rules for NDS Replica Placement, http://support.novell.com/techcenter/articles/ana19970101.html.

Right Scale Blog, Why Amazon's Elastic Block Store Matters, http://blog.rightscale.com/2008/08/20/why-amason-ebs-matters/, Aug. 20, 2008.

Amazon EBS—Elastic Block Store has launched—All Things Distributed, httb://www.allthingsdistributed.com/2008/08/amazon_ebs_elastic_block_store.html, Aug. 28, 2008.

Chang et al., Bigtable: A Distributed Storage System for Structured Data, labs.google.com/papers/bigtable-osdi06.pdf.

* cited by examiner

US 8,010,648 B2

REPLICA PLACEMENT IN A DISTRIBUTED STORAGE SYSTEM

BACKGROUND

Distributed systems, including server farms, web services, and distributed, network-attached storage systems have become increasingly common, providing vast amounts of computational and storage resources. Distributed storage systems use storage space across multiple nodes throughout a potentially wide-area network. Data access routines for accessing data stored on nodes in a distributed storage system gain efficiency in terms of lookup and access times by providing replicas of each data unit throughout the network. However, to maximize efficiency gains, it is necessary to carefully choose the location of each replica within the network of nodes. In addition to placing replicas for efficiency, replicas may also be placed to meet requirements of availability, consistency, integrity, and durability. One challenge is that the placement goals can be contradictory, making the choice of replica placement complex.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

Embodiments of the present invention relate to placing replicas of some data on nodes in a network of nodes by first satisfying location-based preferences while also attempting to place the replicas across fault domains and upgrade domains. In some embodiments, load-based ordering is used to select a node for replica placement, where the load-based ordering can be created using one or a combination of load-based metrics.

BRIEF DESCRIPTION OF THE DRAWINGS

Illustrative embodiments of the present invention are described in detail below with reference to the attached drawing figures, wherein.

DETAILED DESCRIPTION

Figure 1:
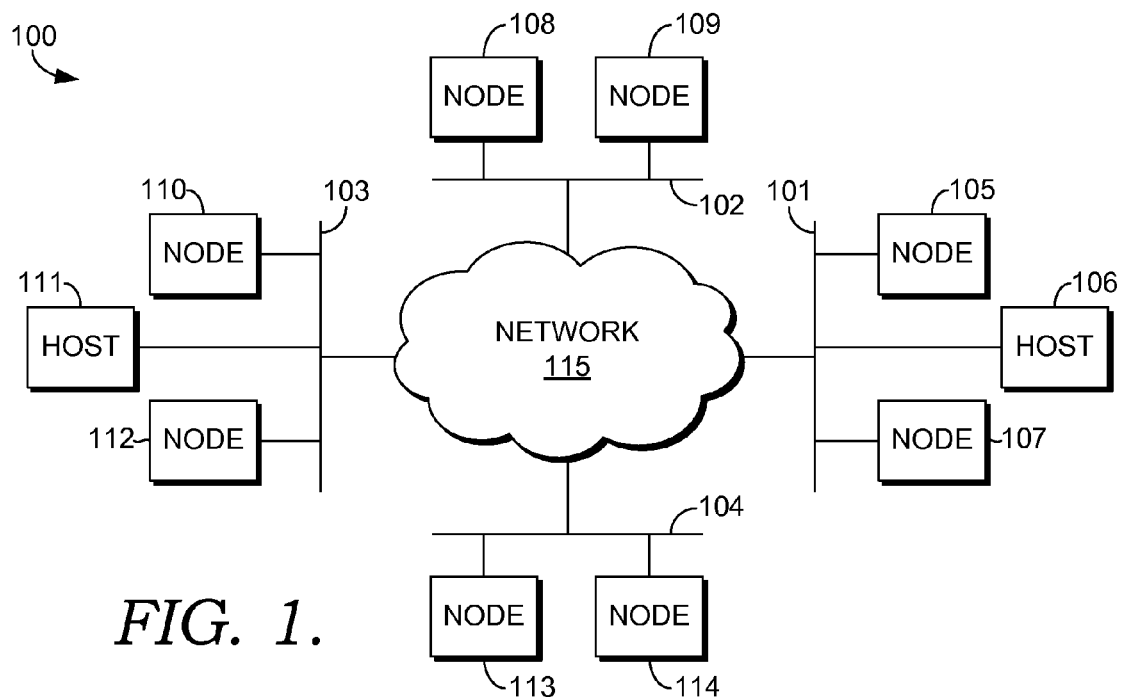
FIG. 1 depicts a diagram of an exemplary network environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to placing replicas of data on nodes in a network of nodes. In a network composed of multiple nodes geographically distributed and designed to deliver data to host computation devices, each of which may also be distributed throughout a large network, each unit of data can be replicated on a wide variety of nodes in the network, increasing the probability that a host requesting the data will be near a replica of that data. Those skilled in the art will recognize that nearness in a network can be measured using a number of different metrics, including geographic nearness, latency, hop count (i.e., information on the number of gateways and routers between a source and destination), and bandwidth. Replication of data has a number of other potential benefits, including fault tolerance. If the data is replicated and one of the nodes storing the data ceases to operate, hosts on the network can still potentially access other replicas of the data.

However, to facilitate this fault tolerance, care must be taken in placing the replicas. In accordance with some embodiments of the present invention, the probability that nodes storing data will not be functional may not be independent across all nodes. In other words, sets of nodes may be likely to stop functioning at nearly the same time. By way of example, consider a number of nodes all connected to the same main power supply. If that power supply were to fail, then all of the nodes so connected would fail at the same time. Nodes whose probabilities of failure are linked in such ways are said to be in the same "fault domain." Those skilled in the art will recognize that there are a number of ways nodes could be connected such that they would be in the same fault domain (e.g., nodes in the same building and nodes on the same network segment).

Failure is not the only event that could make nodes unavailable to deliver data. The need to reboot nodes due to routine maintenance also makes them unavailable to deliver data to hosts on the network. Typically, in large networks with many nodes, the nodes are divided into groups, called "upgrade domains." These upgrade domains are cycled through during upgrade periods, so that maintenance (e.g., software upgrades) is being performed on only one upgrade domain at a time. The cycle continues until all upgrade domains have been processed. This guarantees all nodes will be upgraded and controls the order in which, and time when, each node will be unavailable to hosts on the network.

The specific data being stored in the network can be in many different forms. Common forms include files and groupings of similar files. According to some embodiments of the present invention, the data is organized into streams, wherein each stream is a collection of extents and each extent is composed of a number of append blocks. Extents within a stream cannot be deleted or have the append blocks making them up deleted. Therefore, streams only grow in size.

According to some embodiments of the present invention, location-based preferences for replica placement are entered. By way of illustration, location-based preferences could be entered by an application that knows where users of data are to reside. As another example, if it is known that a particular host will be writing data, then a write preference could be entered for a replica to be placed on a node near that host. Read preferences can also be similarly entered to support nodes likely to be requesting the stored data. While placing replicas, not only should the location-based preferences be fulfilled, but replicas should also be placed in different upgrade domains, fault domains, and on different nodes, to the extent possible, to maximize availability, consistency, integrity, and durability.

Accordingly, an embodiment of the invention is directed to computer-readable storage media embodying computer-executable instructions for placing a replica on a node in a network of nodes. A request for a node matching a location-based preference is made and an indication of a node satisfying the location-based preference is received. A filter is applied to the selected node, the filter including information for identifying one or more fault domains and a one or more upgrade domains. If the filter indicates the selected node as a matching node, a replica is placed on the matching node. If the filter indicates the node is not a matching node, a new node satisfying the location-based preference is requested and the process is repeated until a matching node is found and a replica is placed on the matching node. According to some embodiments of the invention, the location-based preference is updated after the replica is placed on the matching node.

According to other embodiments, the invention is directed to computer-readable storage media storing computer-executable instructions for placing a replica on a node in a network of nodes. A load-based ordering of nodes in the network is created. One of the nodes is selected based on the load-based ordering and a filter is applied to the selected node, where the filter includes a list of fault domains and a list of upgrade domains, until the filter indicates a matching node. A replica is placed on the matching node. According to some embodiments of the invention, after placing the replica on the matching node, the filter is updated.

According to another embodiment, the invention is directed to computer-readable storage media embodying computer-usable instructions for performing a method of placing a plurality of replicas on a plurality of nodes in a network of nodes. The method includes selecting a first node for placement of a first replica based on a first location-based preference. The method also includes placing the first replica on the first node. The method further includes updating location-based preferences for placement of the plurality of replicas to reflect that the first location-based preference has been satisfied by placement of the first replica. The method still further includes updating a filter based on an upgrade domain and fault domain of the selected node at which the first replica was placed. The method also includes repeating a number of steps for subsequent replica placement. The steps include determining if a location-based preference or a load-based ordering is to be used for selecting a new node for placing a new replica. If a load-based ordering is to be used, the method includes selecting the new node according to a load-based ordering. If a location-based preference is to be used, the method includes selecting the new node according to a remaining location-based preference that has not yet been satisfied. A filter is applied to the new node to determine whether an upgrade domain and a fault domain of the new node matches an upgrade domain and fault domain of any node at which another replica of the plurality of replicas has been placed. If the filter does not return a match, the process of selecting a new node based on a location-based preference or a load-based ordering and applying the filter to the new node is repeated until the filter returns a match. When the filter returns a match, the new replica is placed on the selected node. Additionally, the location-based preferences are updated if a location-based preference was satisfied by placement of the new replica. Further, the filter is updated based on an upgrade domain and fault domain of the new node at which the new replica was placed.

Having briefly described an overview of embodiments of the present invention, an exemplary operating environment in which embodiments of the present invention may be implemented is described below in order to provide a general context for various aspects of the present invention. Referring initially to FIG. 1 in particular, a typical network topology 100 consists of a number of interconnected network segments 101, 102, 103, 104, each segment connected to a larger network 115. Network segment 101 has host 106 and two nodes 105, 107 that participate in data replication. Network segment 102 has two nodes 108, 109 that participate in data replication. Network segment 103 has host 111 and two nodes 110, 112 that participate in data replication. Finally, network segment 104 has two nodes that participate in data replication 113, 114.

By way of example of replica placement in accordance with an embodiment of the present invention, consider the case that fault domains are defined by nodes on the same network segment. Therefore, for instance, node 105 and node 107 are in the same fault domain since they share network segment 101. Additionally consider three upgrade domains. The first upgrade domain includes nodes 105, 106, 107, and 108. The second upgrade domain includes nodes 110 and 112. The third upgrade domain includes nodes 109, 113 and 114. Also, consider that both hosts 106 and 111 would like to access data being replicated on nodes in the network. If two replicas are placed on the network, then nodes 105 and nodes 110 could be chosen, for instance, to insure the replicas are close to each host and the two replicas reside in different fault domains and upgrade domains.

Figure 2:
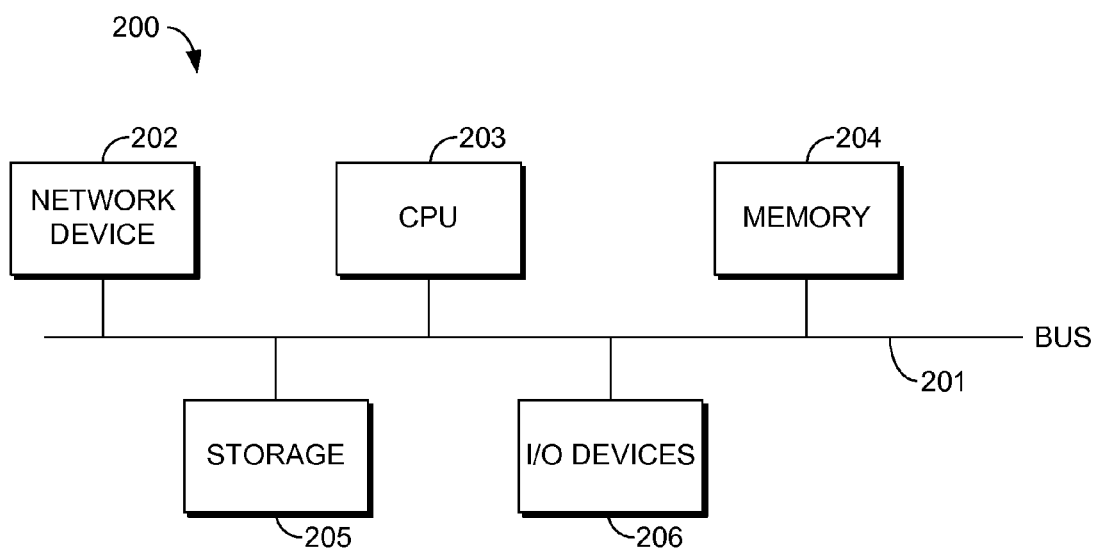
FIG. 2 depicts a block diagram of an exemplary computing device suitable for use in implementing embodiments of the present invention.

Referring now to FIG. 2, an exemplary node is shown and is designated generally as a computing device 200. Computing device 200 is but one example of a suitable computing environment and is not intended to suggest any limitation as to the scope of use or functionality of the invention. Neither should the computing device 200 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 2, computing device 200 includes a bus 201 that directly or indirectly couples the following devices: network device 202, CPU 203, memory 204, storage 205, and input/output (I/O) devices 206. Bus 201 represents what may be one or more buses (such as an address bus, data, bus, or combination thereof). Although the various blocks of FIG. 2 are shown with lines for the sake of clarity, in reality, delineating various components is not so clear, and metaphorically, the lines would more accurately be grey and fuzzy. For example, many processors have memory. We recognize that such is the nature of the art, and reiterate that the diagram of FIG. 2 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 2 and reference to "computing device" or "node."

Computing device 200 typically includes a variety of computer-readable media. Computer-readable media can be any available media that can be accessed by computing device 200 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other non-transitory medium which can be used to store the desired information and which can be accessed by computing device 200.

Memory 204 includes computer-storage media in the form of volatile memory. Exemplary hardware devices include solid-state memory, such as RAM. Storage 205 includes computer-storage media in the form of non-volatile memory. The memory may be removable, nonremovable, or a combination thereof. Exemplary hardware devices include solid-state memory, hard drives, optical-disc drives, etc. Computing device 200 includes one or more processors (CPUs) 203 that read data from various entities such as memory 204, storage 205 or I/O devices 206. I/O devices 206 allow computing device 200 to be logically coupled to other devices including input components and output components, some of which may be built in. Illustrative components include a microphone, joystick, game pad, satellite dish, scanner, printer, wireless device, etc. Computing device 200 includes a network device 202, facilitating communication with other network devices. The network device 202 acts as an additional I/O device.

Figure 3:
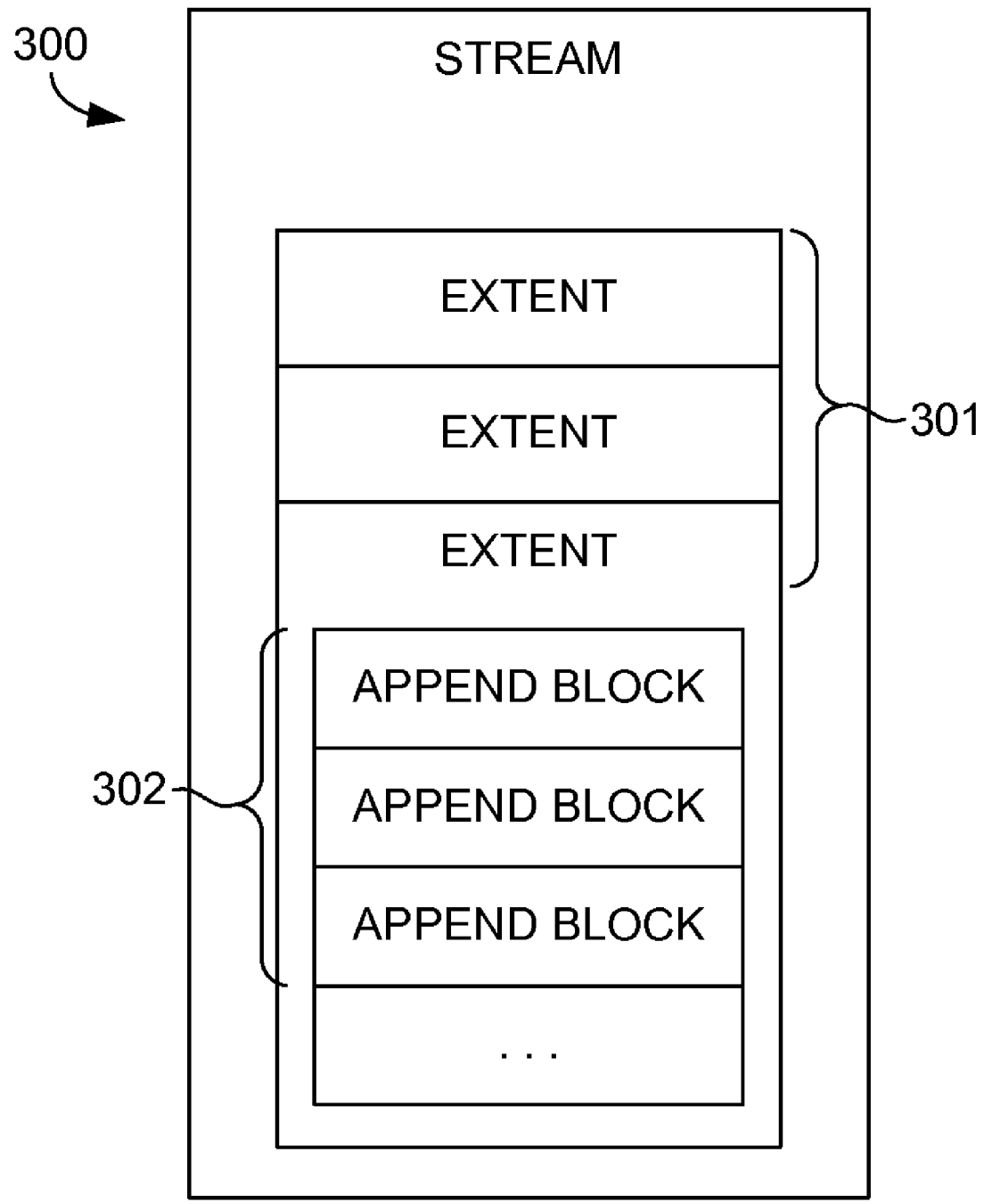
FIG. 3 presents a block diagram of an exemplary stream in accordance with an embodiment of the present invention.

Those skilled in the art will recognize that the data replicated in a network of computing devices, called nodes, can be formatted in many ways. By way of example, it is common for independent data files, such as music files, video files, word processing documents and the like to be replicated. According to an embodiment of the invention, data is modeled as a collection of streams, which may be organized into a conventional hierarchical pathname space. FIG. 3 depicts a stream 300 as an exemplary data format used for replication. A stream 300 is a collection of data that is logically associated. The stream 300 is append-only and limited in size only by hardware. The stream 300 is accessed via a handle and each stream, such as stream 300, has a retention and access policy. The stream 300 is composed of an ordered sequence of extents 301. Extents 301 are units of allocation for streams 300. Extents 301 are also append-only and are identified with a globally unique ID. Extents 301 can be distributed among many nodes in a network and are replicated. Extents 301 typically have a size limit (e.g., 1 GB) imposed either by the application or the storage system. Each extent is composed of a plurality of append blocks 302. Each append block 302 is an application-defined boundary, usually storing a whole number of application-defined records. Append blocks 302 have a finite size (e.g. 2 MB) and are never divided across extents 301. Append blocks 302 can be compressed and decompressed at the client computing devices, called hosts.

Figure 4:
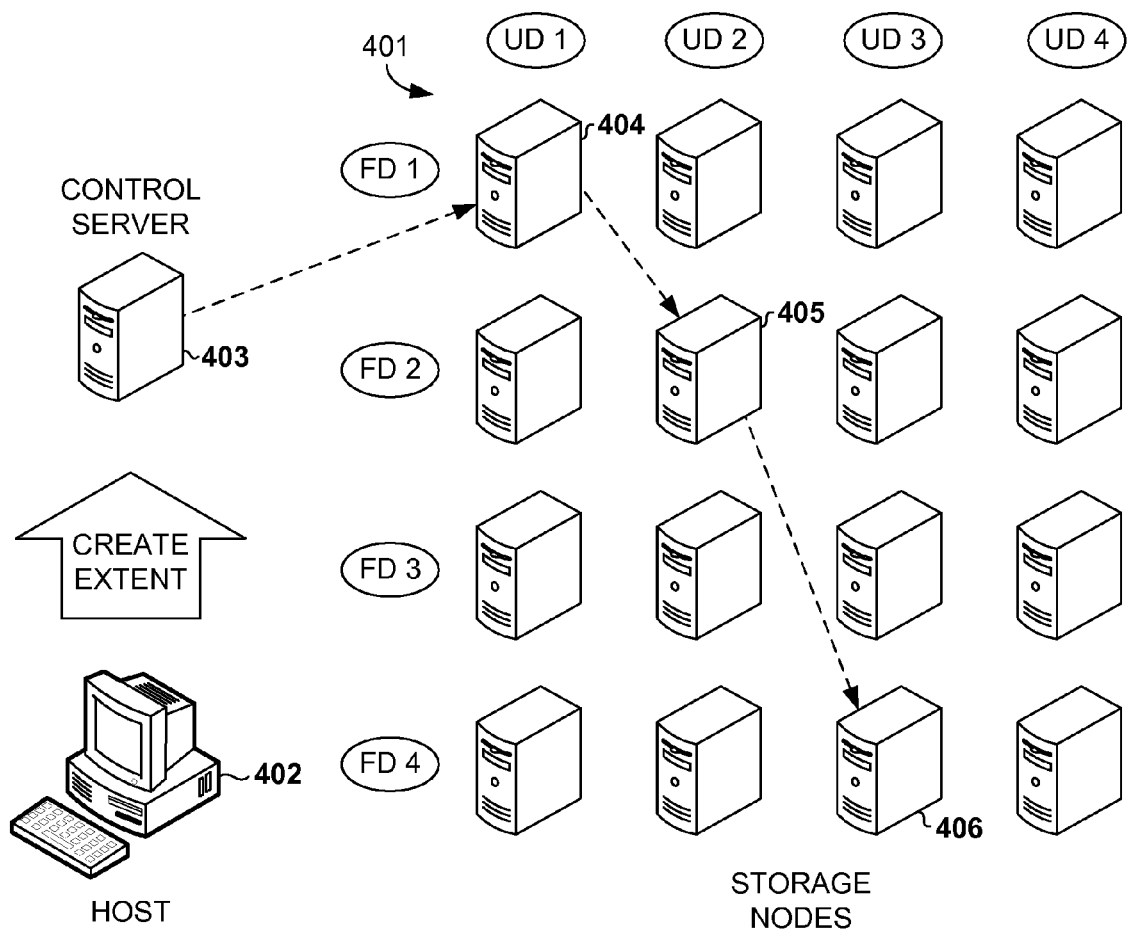
FIG. 4 presents a diagram of an exemplary network of storage nodes in accordance with an embodiment of the present invention.

Referring now to FIG. 4, a block diagram is illustrated that provides an example of a network 401 of storage nodes in accordance with an embodiment of the invention. Conceptually, each storage node is arranged in a number of columns and rows. Each column represents an independent upgrade domain. Each row represents an independent fault domain. The storage nodes' geographic location is not depicted in FIG. 4. It should be understood that the column/row depiction of storage nodes in FIG. 4 is provided to facilitate explanation of replica placement based on fault domains and upgrade domains. In practice, the arrangement of nodes in a storage system may be much more complex.

By way of illustration of replica placement, a host 402 requests a control server 403 to place a replica. As an example, this request could be due to the need to add replicas for an already existing extent. As another example, this could be due to the need to create a new extent. The control server 403 makes decisions about where replicas should be placed in the network of nodes. Assume for the purposes of this illustration that three replicas are to be placed. The control server 403 attempts to select three nodes, none of which reside in either the same row or the same column (i.e., the same fault domain and upgrade domain). One example satisfactory set of nodes is node 404, node 405, and node 406. Those skilled in the art will recognize that there are a number of other possible replica placements that would ensure each replica is placed in a unique fault domain and a unique upgrade domain.

Figure 5:
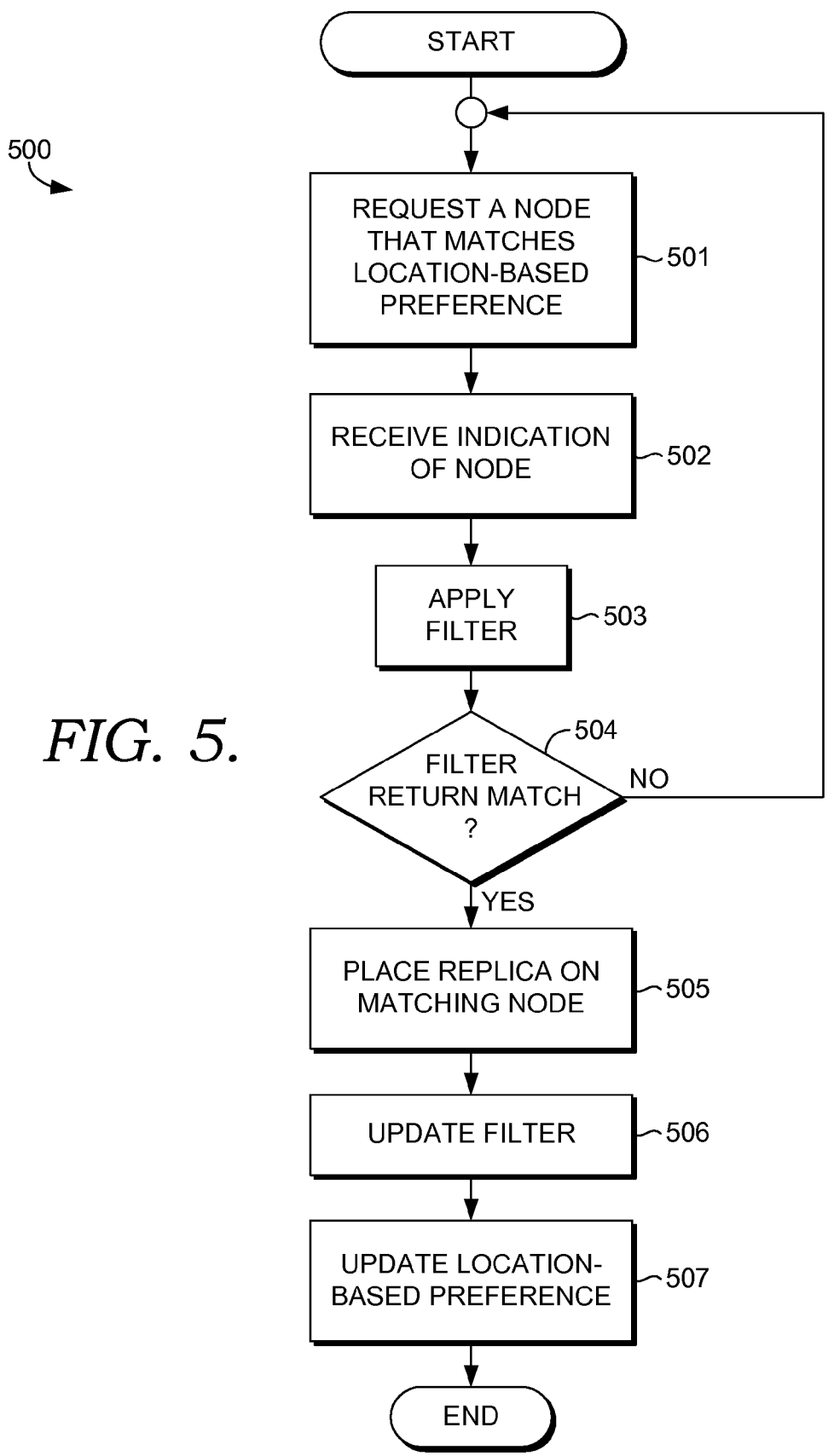
FIG. 5 illustrates a flow diagram showing a method for placing a replica using location-based preferences in accordance with an embodiment of the present invention.

Turning to FIG. 5, a flow diagram is provided that illustrates a method 500 for placing a replica using location-based preferences in accordance with an embodiment of the present invention. The method 500 places replicas based on location-based preferences in addition to considerations for locating replicas of the same data across fault domains and upgrade domains.

As shown at block 501, a node that satisfies a location-based preference and that has sufficient storage space for the replica is requested. Location-based preferences may be specified in a variety of different manners within the scope of embodiments of the present invention. By way of example, location-based preferences could be associated with read or write functionality. These preferences could be specified by an application that knows the location in the network of one or more hosts that are likely to access the replica. As another example, the location-based preferences could be specified according to a pre-determined algorithm. According to some embodiments of the invention, location-based preferences are characterized by metrics dealing with the location of a node with respect to one or more other nodes. For instance, these metrics may include geographical location, hop distance from a reference node, latency from a reference node, bandwidth to a reference node, free storage space information, and disk utilization information. Those skilled in the art will recognize there are other methods for characterizing location within a network topology.

In some embodiments, weighting may be specified as part of the location-based preferences. For instance, weighting could be applied according to the amount of free space in each node. As another example, weighting could be applied according to whether the location-based preference is a write preference or a read preference.

When multiple location-based preferences are specified for placing replicas, a priority for satisfying those preferences may be also provided. As such, the location-based preferences may be satisfied sequentially as each replica of the same data is placed. In an embodiment of the invention, the location-based preferences could be contained in a list of preferences that are ordered based on priority of fulfilling the preferences. Each time a preference is satisfied by placement of a replica, that preference may be indicated as being satisfied (e.g., by removing the preference from the list or by indicating the node on which the replica was placed to satisfy the preference in the list of nodes in the filter). In another embodiment, priority of the location-based preferences may be indicated according to weights assigned to each preference. According to a further embodiment, one or more location-based preferences could be combined into a single preference according to an algorithm. By way of example, two location-based preferences could be combined by choosing the mean location as the basis for the combined preference.

An indication of a node matching the location-based preference and having sufficient storage space for the replica is received at block 502. In some embodiments, at least a portion of the nodes in the network may be ordered based on the location-based preference, and the highest ordered node may be selected at block 502.

As discussed previously, embodiments of the present invention attempt to place replicas based on location-based preferences but also to distribute replicas of the same data across fault domains and upgrade domains. Accordingly, as shown at block 503, a filter is applied to the selected node to determine whether the selected node is in a fault domain or upgrade domain of nodes in which other replicas of the same data have already been placed. Additionally, in some embodiments, the filter ensures two replicas are not placed on the same node. In various embodiments of the present invention, the filter includes information that may be used to determine whether the fault domain and/or upgrade domain of the selected node matches the fault domain and/or upgrade domain of any node on which another replica of the same data has already been placed. By way of illustration, the filter may contain a combination of one or more of the following: a list of upgrade domains in which other replicas of the same data already reside, a list of fault domains in which other replicas of the same data already reside, and a list of nodes in which other replicas of the same data already reside. In another embodiment, the filter could contain lists of fault domains and replica domains for which no other replica of the same data exists. Those skilled in the art will recognize that there are many other ways in which the information in the filter could be represented.

In some embodiments, the filter may also include load information for determining whether the indicated node is acceptable for replica placement. One skilled in the art will recognize that a number of metrics, either alone or in combination, can be used to characterize the load of a node, including but not limited to: latency information, bandwidth information, free storage space information, and disk utilization information.

It should be noted that if the current replica being placed is the first replica of the data to be placed, the filter does not need to be applied as the replica may be placed in any fault domain and/or upgrade domain. In some embodiments, the filter may be applied even in the case of a first replica. However, because no other replicas have placed yet, the filter will not prevent the selected node from being indicated as a matching node for placing the replica.

A test is performed to see if the filter returned a match, indicating that the node to which the filter was applied passed all of the criteria in the filter, as shown at block 504. According to an embodiment of the invention, a filter would return a match on a node if the upgrade domain and fault domain of the node are different than the upgrade domain and fault domain of nodes on which each other replica of the same data has already been placed. In some embodiments, the filter would return a match on a node if the node is not in a list of nodes already containing replicas of the same data.

If the filter did not return a match, then a new node that satisfies the location-based preference is requested, as shown by the return to block 501. In embodiments in which an ordered list of nodes has been generated based on the location-based preference, the next node in the list is selected. Blocks 502 through 504 are repeated to determine if the new node is a match. In an embodiment, the process of selecting a new node satisfying the location-based preference and applying the filter is continued until a matching node is determined. In some embodiments, however, if the filter fails to return a match a threshold number of times, the filter can be relaxed. Relaxing the filter involves removing one or more of the restrictions the filter places on the choice of node. By way of illustration, a filter containing a list of upgrade domains for which no more replicas are allowed, and a list of fault domains for which no more replicas are allowed is relaxed by having one of the list of upgrade domains removed. As another example, for the same filter, one of the list of fault domains is removed. Those skilled in the art will recognize there are other algorithms by which a filter could be relaxed.

If the filter does return a match at block 504, then a replica is placed on the matched node, as shown at block 505. The filter is updated, as shown at block 506, to reflect the placement of this replica on the matched node. For example, the fault domain and upgrade domain of the matched node may be added to or removed from the filter lists. As such, when further replicas of the same data are placed, the further replicas may be placed in other upgrade domains and fault domains. According to some embodiments of the invention, the node may be added to or removed from the filter lists, ensuring no further replicas will be placed on the node. As shown at block 507, the location-based preference list is also updated, for example, by removing the location-based preference or preferences satisfied by the matched node. As such, when the next replica of the same data is placed, the next location-based preference may be satisfied by the placement of that next replica.

According to some embodiments of the invention, a new replica may need to be placed subsequent to the placement of other replicas of the same data. In such embodiments, the filter for use in placing that new replica (e.g., at block 503 of FIG. 5) may need to be rebuilt if the filter was not maintained after the previous placement of the other replicas. To rebuild the filter, the list of nodes already containing replicas could be walked through, where, for each node, the node's upgrade domain and fault domain are added to (or removed from) the filter's lists. Additionally, the nodes already containing replicas could be added to the filter's list of nodes. Using the rebuilt filter, the method 500 can be performed to place the new replica.

Figure 6:
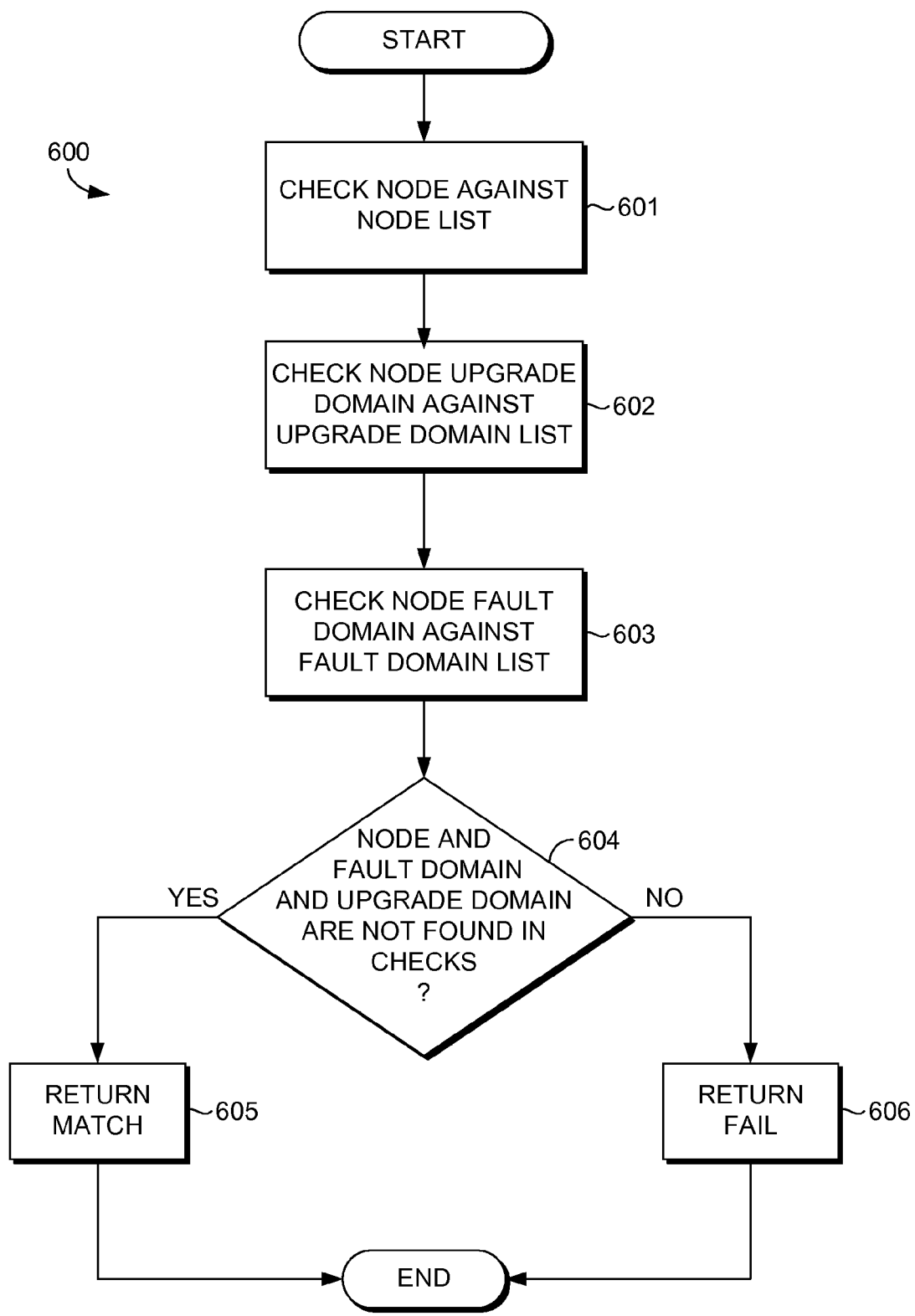
FIG. 6 illustrates a flow diagram showing a method for applying a filter to place replicas across fault domains and upgrade domains in accordance with an embodiment of the present invention.

Turning now to FIG. 6, a flow diagram is depicted showing a method 600 of applying a filter to identify a matching node in accordance with an embodiment of the present invention. The method 600 may be used, for instance, to determine whether a selected node should be employed for replica placement based on filter parameters, including considerations of fault domains and upgrade domains. In some embodiments, the method 600 is employed at block 503 of FIG. 5.

In an embodiment, to apply a filter to a given node, the node is checked against the filter's list of nodes already containing replicas, as shown at block 601. The node's upgrade domain is checked against the filter's upgrade domain list, which contains upgrade domains already containing a replica of the same data, as shown at block 602. The node's fault domain is likewise checked against the filter's fault domain list, which contains fault domains already containing a replica of the same data, as shown at block 603. If the node is not in the filter's list of nodes, the node's fault domain is not present in the filter's fault domain list, and the node's upgrade domain is not in the filter's upgrade domain list, as shown at block 604, then the filter returns a match, as shown at block 605. Otherwise, the filter returns a failure, as shown at block 606.

Those skilled in the art will recognize that there are many other formats of the filter's lists that would perform the desired function. By way of example, the lists could contain a list of fault domains and upgrade domains not containing a replica of the same data. The check in this case would be to determine if the node's fault domain and upgrade domain were contained in the filter's lists. If so, the filter returns a match. Otherwise, the filter returns a failure.

According to other embodiments of the invention, other characteristics could be included in the filter check such as load information. One skilled in the art will recognize that other orderings of the application of the filter's checks are possible without altering the behavior of the filter.

According to some embodiments of the invention, it may be desirable to place a replica not based on location-based preferences. For instance, all location-based preferences that have been specified could have already been satisfied by other replicas of the same data or a node failure could have caused the need to create a new replica. In such embodiments, nodes may be selected for replica placement randomly or based on other criteria, such as load information. In some embodiments, nodes are selected randomly with weighted preferences based on load information.

Figure 7:
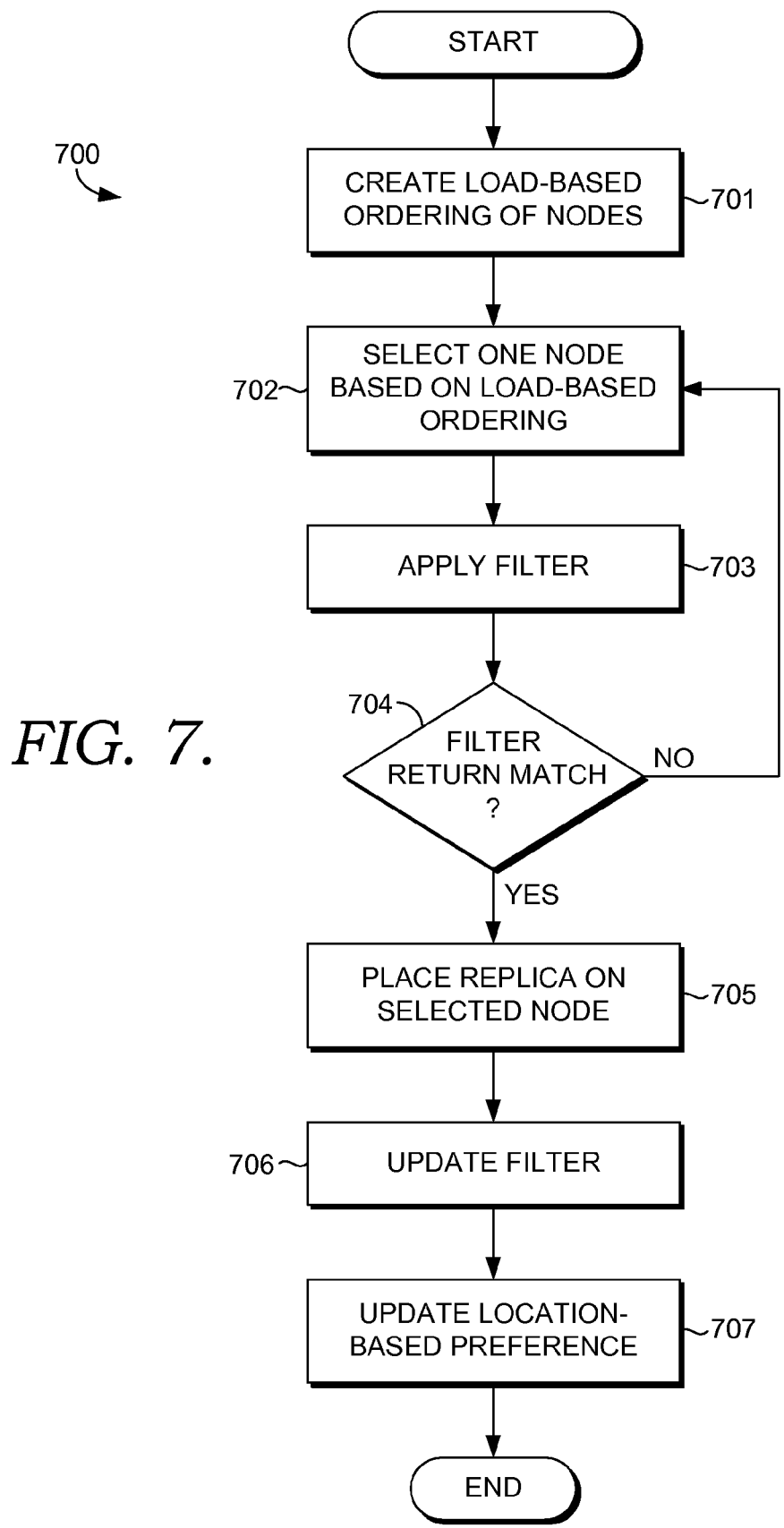
FIG. 7 illustrates a flow diagram showing a method for placing a replica based on load-based ordering in accordance with an embodiment of the present invention.

Referring to FIG. 7, a flow diagram is depicted showing a method 700 for placing a replica on a node in a network of nodes using load-based information in accordance with an embodiment of the present invention. In accordance with the method 700, a load-based ordering of nodes in the network of nodes is created at block 701. According to some embodiments of the invention, load-based information is characterized by metrics of the node that is the potential location of the replica. For instances, metrics of a node used to determine load may include a combination of one or more of the following: free space, disk utilization information, bandwidth, and latency. Those skilled in the art will recognize that there are other possible ways to characterize the load on a node.

A node is selected based on the load-based ordering, as shown at block 702. According to one embodiment of the invention, the node is selected by first choosing a random number and then identifying the node whose placement in the load-based ordering corresponds with the random number.

A filter is applied to the selected node, as shown at block 703, to determine whether the fault domain or the upgrade domain of the selected node is different from the fault domains and the upgrade domains of other replicas of the same data that have already been placed in the network. Additionally, the filter may ensure that replica placement will be made on a node containing no replicas of the same data. In an embodiment, the application of the filter may be similar to that described with reference to FIG. 6. The result of the filter is checked, as shown at block 704. If the filter does not return a match, a new node is selected based on the load-based ordering as represented by the return to block 702, and blocks 703 and 704 are repeated. The process of selecting a node and applying the filter from block 702 through block 704 is repeated until a matching node is determined.

If the filter returns a match at block 704, the replica is placed on the selected node, as shown at block 705. The filter is updated, as shown at block 706, to reflect the node at which the replica was replaced, that node's upgrade domain, and/or that node's fault domain.

Figure 8:
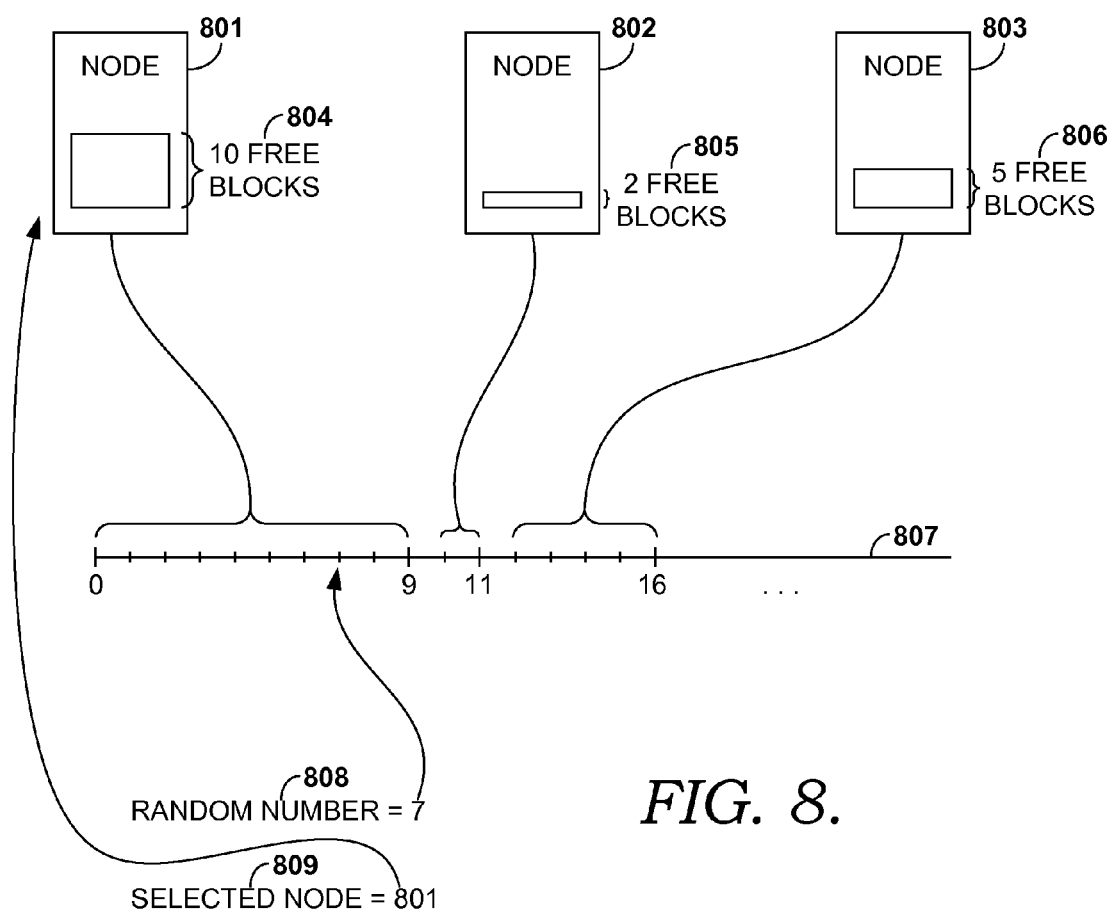
FIG. 8 illustrates a diagram depicting an exemplary method of choosing a node based on a load-based ordering in accordance with an embodiment of the present invention.

Referring now to FIG. 8, a weighted ordering of nodes is depicted that may be used, for instance, in the load-based ordering described with reference is FIG. 7. Those skilled in the art will recognize that, while for illustration purposes, free blocks of memory 804, 805, 806 are used to comprise the load-based information, other information could be used, alone or in combination to characterize the load of a node, including but not limited to: bandwidth information, latency information, and disk utilization information.

The example scenario in FIG. 8 includes three nodes 801, 802, 803, each with a corresponding amount of free blocks of memory 804, 805, 806. Each node is associated with a segment of a number line 807, in which the size of each associated segment is representative of the number of free blocks of the respective nodes. Other methods of mapping load-based information to number line space could be used, such as using a segment size that is proportional to the load-based information according to a formula. By way of example, node 801 has ten free blocks 804 and is associated with ten numbers on the number line 807, namely, zero through nine. To use a random selection weighted by load-based information, a random number 808 is selected. In the example, the number is seven. The number seven is associated with node 801 on the number line. Therefore, the selected node 809 is node 801. Those skilled in the art will recognize that this method can encompass a number of other weighting functions involving a plurality of load-based information, as previously discussed.

Figure 9A:
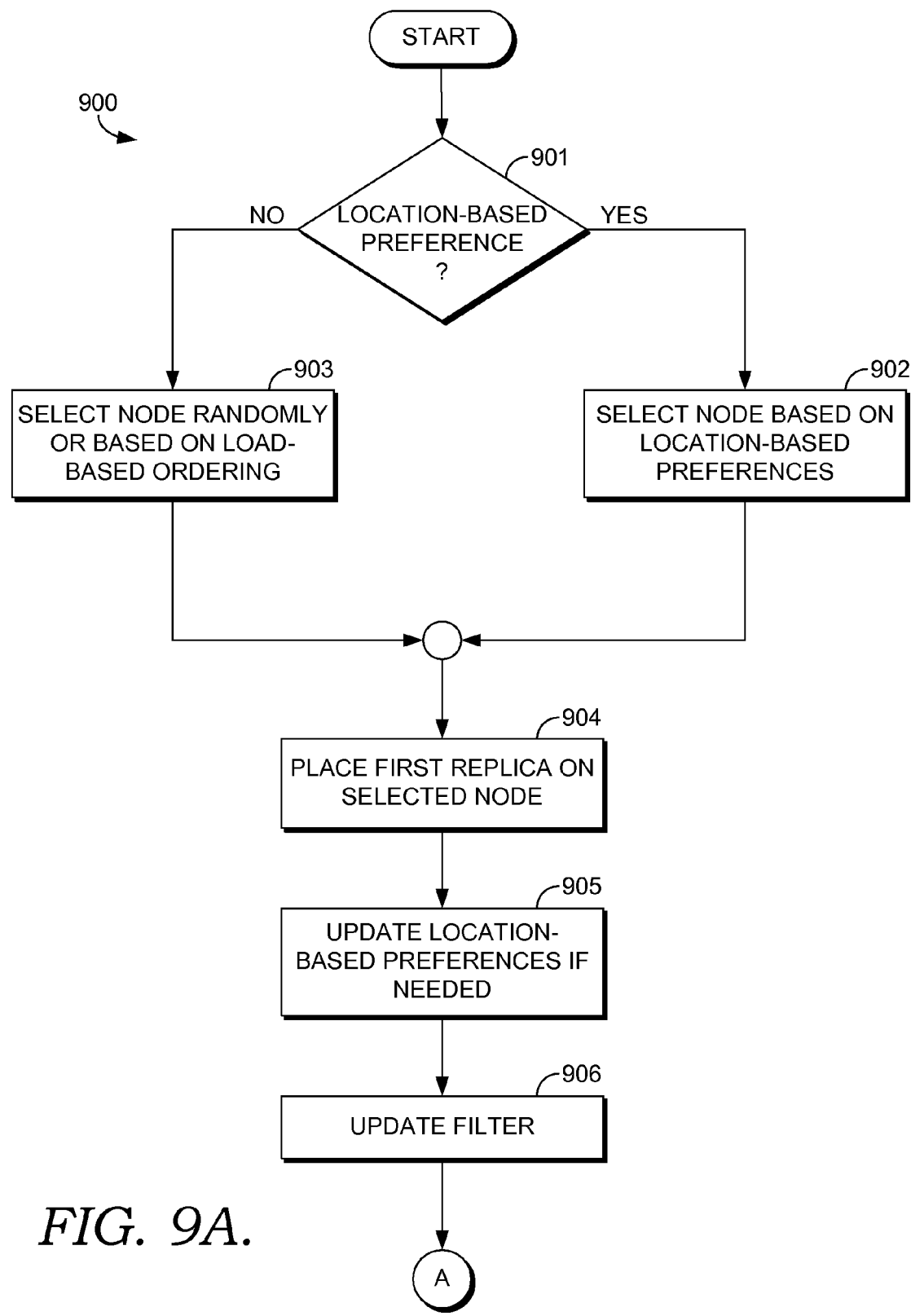
FIGS. 9A and 9B illustrate a flow diagram showing a method for placing multiple replicas in accordance with an embodiment of the present invention.
Figure 9B:
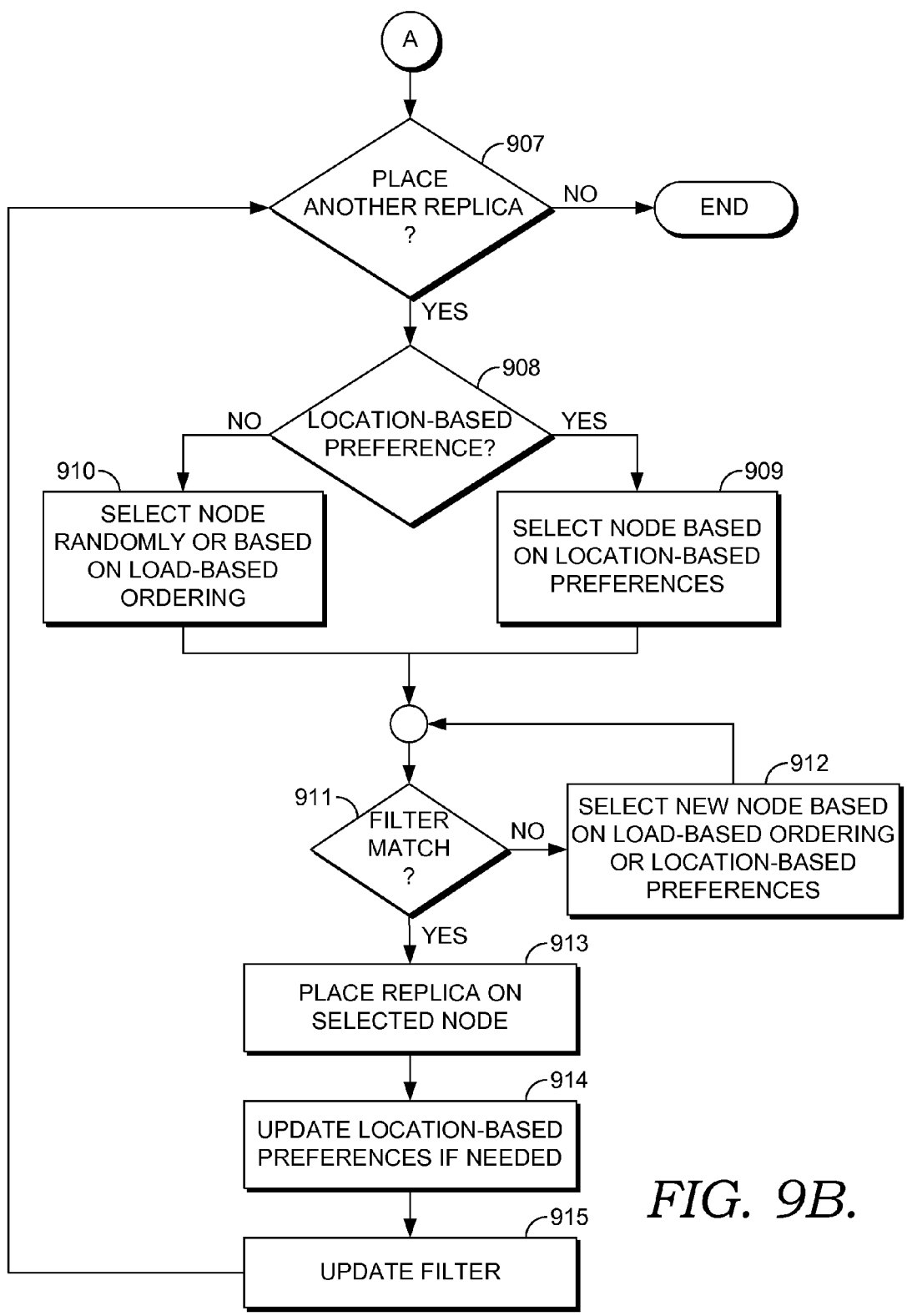

Turning now to FIG. 9, a flow diagram is presented showing a method 900 of placing multiple replicas of the same data in a network of storage nodes in accordance with an embodiment of the present invention. As shown at block 901, a determination is made regarding whether a location-based preference, similar to the preferences described earlier, or a load-based ordering, similar to the previously described orderings, is to be used to choose a selected node. For instance, the determination may be made whether any location-based preferences have been specified for the placement of the multiple replicas. If a location-based preference is to be used, then a node is selected based on an identified location-based preference, as shown at block 902. In an embodiment, this may be performed in a manner similar to blocks 501 and 502 of FIG. 5. Alternatively, if a load-based ordering is to be used, then a node is selected based on the load-based ordering, as shown at block 903. In an embodiment, this may be performed in a manner similar to blocks 701 and 702 of FIG. 7. In some embodiments, the node may be randomly selected at block 903.

A first replica is placed on the selected node, as shown at block 904. Because this is the first replica of the data to be placed, a filter such as that described above may not be employed or, if employed, would indicate the selected node as a match as there have been no other replicas placed yet that would remove upgrade domains and fault domains from consideration for the placement of this first replica.

If location-based preferences have been specified for the placement of these replicas, those preferences are updated at block 905 to reflect at least one of the location-based preferences being satisfied by the placement of the replica. According to some embodiments of the invention, the location-based preferences will only need to be updated if the location-based preference was used to choose the selected node. According to other embodiments of the invention, a location-based preference needs to be updated, even though it was not used to choose the selected node. The filter is updated, as shown at block 906, by adding (or removing) information about the selected node (e.g., identification of the node, the nodes' upgrade domain, and/or the node's fault domain). According to some embodiments of the invention, the filter may be created after the first replica is placed.

After placing the first replica, whether there is another replica to be placed is determined at block 907. If there is not another replica to be placed, the process ends. Alternatively, if another replica needs to be placed, another determination is made regarding whether a location-based preference or a load-based ordering is to be used for choosing the next selected node, as shown at block 908. If it is determined that a location-based preference is to be used (e.g., if there is still at least one location-based preference that still need to be fulfilled), a location-based preference is identified and used to choose a new selected node, as shown at block 909. If it is determined that a load-based ordering is to be used (e.g., if all location-based preferences have been satisfied), a random or load-based ordering is used to choose a new selected node, as shown at block 910.

The filter is applied to the selected node, as shown at block 911. Application of the filter may be similar to the process discussed with reference to block 503 of FIG. 5. The filter may be applied to determine if the upgrade domain and fault domain of the selected node is different from the upgrade domain and fault domain of previously placed replica(s).

If the filter fails to return a match, a new node is selected, as shown in block 912, either based on the location-based preference, the load-based ordering, or random selection as previously determined for this replica placement. The process of selecting a new node and applying the filter is repeated until a match is returned.

When a match is returned from block 911, a replica is placed on the matched node, as shown in block 913. Location-based preferences are updated, if required, as shown in block 914 to indicate that a location-based preference has been satisfied by the placement of the replica. The filter is also updated, as shown at block 915, to reflect the upgrade domain and fault domain of the node at which the replica was placed.

After placing the replica, whether another replica needs to be placed is determined again at block 907. If another replica does not need to be placed, the process ends. Otherwise, the process of blocks 908 through 915 is repeated to place the replica. As such, the process of blocks 907 through 915 is repeated until all replicas have been placed.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer storage media storing computer executable instructions for performing a method of placing a plurality of replicas on a plurality of nodes in a network of nodes, the method comprising:
   selecting a first node for placement of a first replica based on a first location-based preference;
   placing the first replica on the first node;
   updating location-based preferences for placement of the plurality of replicas to reflect that the first location-based preference has been satisfied by placement of the first replica, wherein the location-based preferences comprise an ordered list with write preferences ordered before read preferences;
   updating a filter based on an upgrade domain and fault domain of the selected node at which the first replica was placed, wherein each upgrade domain contains two or more nodes to receive upgrades; and
   iteratively repeating:
   determining if a location-based preference or a load-based ordering is to be used for selecting a new node for placing a new replica;
   if a load-based ordering is to be used, selecting the new node according to a load-based ordering;
   if a location-based preference is to be used, selecting the new node according to a remaining location-based preference that has not yet been satisfied;
   applying the filter to the new node to determine whether an upgrade domain and a fault domain of the new node matches an upgrade domain and fault domain of any node at which another replica of the plurality of replicas has been placed;
   if the filter does not return a match, repeating selecting a new node based on a location-based preference or a load-based ordering and applying the filter to the new node until the filter returns a match;
   when the filter returns a match, placing the new replica on the new node;
   updating the location-based preferences if a location-based preference was satisfied by placement of the new replica; and
   updating the filter based on an upgrade domain and fault domain of the new node at which the new replica was placed,
   until there are no more replicas to be placed.

2. The media of claim 1, further comprising, if a threshold number of matching nodes fail to return a match upon applying the filter, relaxing the filter.

3. The media of claim 2, wherein relaxing the filter comprises one or more of the following:
   removing one or more entries from a list of fault domains; and removing one or more entries from a list of upgrade domains.

4. The media of claim 1, further comprising creating a load-based ordering.

5. The media of claim 4, wherein creating the load-based ordering comprises:
receiving a list of nodes and a load on each of the nodes; and
allotting each of the nodes on the list a range of numbers, a size of the range equivalent to the respective load on the node, wherein the range of numbers are consecutively chosen and non-overlapping.

6. The media of claim 5, wherein the load is calculated based on one or more of the following: latency information, bandwidth information, free storage space information, disk utilization information.

7. The media of claim 5, wherein selecting the new node according to a load-based ordering comprises:
selecting a random number; and
selecting the node whose allotted range of numbers contains the random number as the selected node.

8. The media of claim 1, wherein the location-based preferences indicate a priority for satisfying the location-based preferences.

9. The media of claim 1, wherein the location-based preferences comprise one or more location-based write preferences and one or more location-based read preferences.

10. A replica-placement apparatus for placing a plurality of replicas on a plurality of nodes in a network of nodes, the replica-placement apparatus including a processor and one or more computer-storage media storing a placement application for performing a method comprising:
selecting a first node for placement of a first replica based on a first location-based preference;
placing the first replica on the first node;
updating location-based preferences for placement of the plurality of replicas to reflect that the first location-based preference has been satisfied by placement of the first replica, wherein the location-based preferences comprise an ordered list with write preferences ordered before read preferences;
updating a filter based on an upgrade domain and fault domain of the selected node at which the first replica was placed, wherein each upgrade domain contains two or more nodes to receive upgrades; and
iteratively repeating:
determining if a location-based preference or a load-based ordering is to be used for selecting a new node for placing a new replica;
if a load-based ordering is to be used, selecting the new node according to a load-based ordering;
if a location-based preference is to be used, selecting the new node according to a remaining location-based preference that has not yet been satisfied;
applying the filter to the new node to determine whether an upgrade domain and a fault domain of the new node matches an upgrade domain and fault domain of any node at which another replica of the plurality of replicas has been placed;
if the filter does not return a match, repeating selecting a new node based on a location-based preference or a load-based ordering and applying the filter to the new node until the filter returns a match;
when the filter returns a match, placing the new replica on the new node;
updating the location-based preferences if a location-based preference was satisfied by placement of the new replica; and
updating the filter based on an upgrade domain and fault domain of the new node at which the new replica was placed,
until there are no more replicas to be placed.

11. The apparatus of claim 10, including the placement application for performing a method further comprising, if a threshold number of matching nodes fail to return a match upon applying the filter, relaxing the filter.

12. The media of claim 11, wherein relaxing the filter comprises one or more of the following:
removing one or more entries from a list of fault domains; and
removing one or more entries from a list of upgrade domains.

13. The media of claim 10, further comprising creating a load-based ordering.

14. The media of claim 13, wherein creating the load-based ordering comprises:
receiving a list of nodes and a load on each of the nodes; and
allotting each of the nodes on the list a range of numbers, a size of the range equivalent to the respective load on the node, wherein the range of numbers are consecutively chosen and non-overlapping.

15. The media of claim 14, wherein the load is calculated based on one or more of the following: latency information, bandwidth information, free storage space information, disk utilization information.

16. The media of claim 14, wherein selecting the new node according to a load-based ordering comprises:
selecting a random number; and
selecting the node whose allotted range of numbers contains the random number as the selected node.

17. The media of claim 10, wherein the location-based preferences indicate a priority for satisfying the location-based preferences.

18. The media of claim 10, wherein the location-based preferences comprise one or more location-based write preferences and one or more location-based read preferences.

19. A method of placing a plurality of replicas on a plurality of nodes in a network of nodes, the method comprising:
selecting a first node for placement of a first replica based on a first location-based preference;
placing the first replica on the first node;
updating location-based preferences for placement of the plurality of replicas to reflect that the first location-based preference has been satisfied by placement of the first replica, wherein the location-based preferences comprise an ordered list with write preferences ordered before read preferences;
updating a filter based on an upgrade domain and fault domain of the selected node at which the first replica was placed, wherein each upgrade domain contains two or more nodes to receive upgrades; and
iteratively repeating:
determining if a location-based preference or a load-based ordering is to be used for selecting a new node for placing a new replica;
if a load-based ordering is to be used, selecting the new node according to a load-based ordering;
if a location-based preference is to be used, selecting the new node according to a remaining location-based preference that has not yet been satisfied;

applying the filter to the new node to determine whether an upgrade domain and a fault domain of the new node matches an upgrade domain and fault domain of any node at which another replica of the plurality of replicas has been placed;

if the filter does not return a match, repeating selecting a new node based on a location-based preference or a load-based ordering and applying the filter to the new node until the filter returns a match;

when the filter returns a match, placing the new replica on the new node;

updating the location-based preferences if a location-based preference was satisfied by placement of the new replica; and updating the filter based on an upgrade domain and fault domain of the new node at which the new replica was placed, until there are no more replicas to be placed.

* * * * *